United States Patent
Lutterbeck et al.

(10) Patent No.: US 11,110,890 B2
(45) Date of Patent: Sep. 7, 2021

(54) METHOD FOR LOCKING AND/OR UNLOCKING A VEHICLE

(71) Applicant: DAIMLER AG, Stuttgart (DE)

(72) Inventors: Verena Lutterbeck, Gärtringen (DE); Benjamin Burger, Weil im Schönbuch (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 17/048,281

(22) PCT Filed: Mar. 6, 2019

(86) PCT No.: PCT/EP2019/055550
§ 371 (c)(1),
(2) Date: Oct. 16, 2020

(87) PCT Pub. No.: WO2019/201504
PCT Pub. Date: Oct. 24, 2019

(65) Prior Publication Data
US 2021/0039593 A1    Feb. 11, 2021

(30) Foreign Application Priority Data
Apr. 17, 2018  (DE) ...................... 10 2018 003 111.0

(51) Int. Cl.
*B60R 25/23* (2013.01)
*B60R 25/01* (2013.01)
(Continued)

(52) U.S. Cl.
CPC .............. *B60R 25/23* (2013.01); *B60R 25/01* (2013.01); *B60R 25/246* (2013.01); *B60R 25/305* (2013.01); *B60R 2325/205* (2013.01)

(58) Field of Classification Search
CPC ....... B60R 25/23; B60R 25/01; B60R 25/246; B60R 25/305; B60R 2325/205;
(Continued)

(56) References Cited

U.S. PATENT DOCUMENTS 9,518,408 B1  12/2016  Krishnan
9,957,737 B2   5/2018  Patel et al.
(Continued)

FOREIGN PATENT DOCUMENTS

DE  102010037271 A1  2/2012
DE  102013212083 A1  1/2014
(Continued)

OTHER PUBLICATIONS

Examination Report dated Dec. 7, 2018 in related/corresponding DE Application No. 10 2018 003 111.0.
(Continued)

*Primary Examiner* — Edwin C Holloway, III
(74) *Attorney, Agent, or Firm* — Patent Portoflio Builders PLLC

(57) ABSTRACT

A method for locking and/or unlocking a vehicle having an input device for a code on the vehicle, via which the vehicle can be locked and/or unlocked, involves requesting the code via a mobile device having a mobile number registered to the respective vehicle with a data server. After the request, the data server generates a current code and send this to the mobile device and to the vehicle. The code can then be input via the input device and compared to the code sent to the vehicle and, should they match, locking and/or unlocking of the vehicle is enabled.

9 Claims, 1 Drawing Sheet

Figure 1:
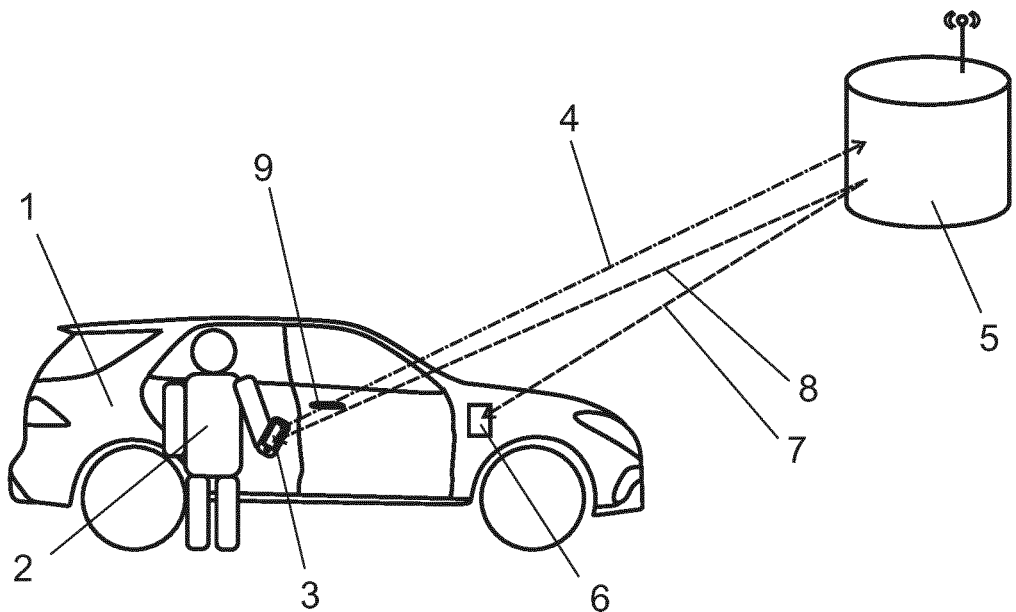

(51) Int. Cl.
*B60R 25/24* (2013.01)
*B60R 25/30* (2013.01)

(58) Field of Classification Search
CPC ...... G07C 2009/00825; G07C 9/00817; G07C 9/0069; G07C 9/00571
USPC ..................................... 340/5.54, 5.72, 5.61
See application file for complete search history.

(56) References Cited

U.S. PATENT DOCUMENTS

| | | | | |
|---|---|---|---|---|
| 2004/0164615 | A1* | 8/2004 | Alexandropoulos | ........................ B60R 25/243 307/10.1 |
| 2005/0073388 | A1* | 4/2005 | Lee | ................. B60R 25/04 340/5.1 |
| 2007/0200671 | A1* | 8/2007 | Kelley | ................. B60R 25/257 340/5.72 |
| 2008/0136611 | A1* | 6/2008 | Benco | ................. B60R 25/2018 340/426.3 |
| 2008/0150677 | A1* | 6/2008 | Arakawa | ............ B60R 25/2018 340/5.2 |
| 2013/0194068 | A1 | 8/2013 | Mönig et al. | |
| 2014/0015637 | A1* | 1/2014 | Dassanayake | ..... G07C 9/00174 340/5.54 |
| 2014/0068247 | A1* | 3/2014 | Davis | ................... H04L 9/3228 713/155 |
| 2015/0102898 | A1 | 4/2015 | Huennekens et al. | |
| 2015/0294518 | A1* | 10/2015 | Peplin | ................. G07C 9/00571 340/5.22 |
| 2016/0096508 | A1* | 4/2016 | Oz | ........................ H04L 63/08 701/36 |
| 2016/0301698 | A1 | 10/2016 | Katara et al. | |
| 2017/0116800 | A1* | 4/2017 | Lin | ........................ B60R 25/01 |
| 2019/0193678 | A1 | 6/2019 | Leiber | |

FOREIGN PATENT DOCUMENTS

| | | |
|---|---|---|
| DE | 102013225106 A1 | 6/2015 |
| DE | 102015206255 A1 | 10/2015 |
| DE | 202016102459 U1 | 7/2016 |
| DE | 102016116042 A1 | 3/2018 |
| DE | 102016218071 A1 | 3/2018 |
| EP | 2042393 A2 | 4/2009 |
| EP | 2743868 A1 | 6/2014 |
| GB | 2505756 A | 3/2014 |
| WO | 2004072785 A2 | 8/2004 |
| WO | 2013090211 A2 | 6/2013 |

OTHER PUBLICATIONS

International Search Report dated Jun. 6, 2019 in related/corresponding International Application No. PCT/EP2019/055550.
Written Opinion dated Jun. 6, 2019 in related/corresponding International Application No. PCT/EP2019/055550.

* cited by examiner

METHOD FOR LOCKING AND/OR UNLOCKING A VEHICLE

BACKGROUND AND SUMMARY OF THE INVENTION

Exemplary embodiments of the invention relate to a method for locking and/or unlocking a vehicle having an input device for a code on the vehicle, via which it can be locked and/or unlocked.

In principle, the input of a code for locking and/or unlocking vehicles is known from the prior art. Thus, by way of example, an electronic door locking device having a sensor is described in DE 10 2013 212 083 A1. Here, a keyboard, inter alia, can be used for inputting a security code or similar in order to lock and/or unlock the vehicle and to drive it. Moreover, a door unlocking system is known from DE 20 2016 102 459 U1 by the same applicant, in which individual input features can be used to input a security code, in order to unlock the vehicle.

Moreover, from the general prior art, the 4th generation Legacy by the car manufacturer Subaru provides for a code fixedly programmed in the vehicle that can be used to unlock and to issue driving authorization for a vehicle. Here, this code consists of five individual numbers. These are correspondingly input by correspondingly frequent pulling of the outside door handle, for example, or by tapping a button to control the trunk. By way of example, for the number 2, the user must pull or tap twice. Then, after a short pause, the next number of the numerical code is input etc. Once the input and checking in the vehicle is complete, the vehicle can then be opened and started.

Here, it is particularly problematic with all these solutions that, on one hand, the code enables extensive functions in the vehicle, and, on the other hand, it can be spied on relatively easily, for example by a potential car thief observing the pulling of the door handle to input the code, for example with the Subaru Legacy. If they see the same vehicle again later, they can recall their observation and open and steal the vehicle.

Exemplary embodiments of the present invention are directed to an improved method for locking and/or unlocking a vehicle via a code, which is particularly suitable for emergency locking and/or unlocking, for example when the actual vehicle key is not exactly to hand or if someone has been accidentally entrapped inside the vehicle.

With the method according to the invention it is such that the user requires a mobile telephone, and, via the cellular connection, the vehicle must be able to communicate with a server. The code required for locking and/or unlocking the vehicle is then requested by a data server via the mobile device having a mobile number registered to the respective vehicle, the mobile number having to be previously saved as one of several possible numbers in combination with the vehicle. The data server then creates a current code and, on one hand, sends this to the mobile device and, on the other hand, to the vehicle. The user can then input this code on the vehicle via the input device. This is then compared to the code sent to the vehicle inside the vehicle and, if they match, the locking and/or unlocking of the vehicle is enabled. The user is then able to unlock or to lock the vehicle via a respectively requested current code, even without a key being present.

They can thus unlock the vehicle, for example even if they have locked the actual key in the vehicle. Then, using the method according to the invention, they are able to get this key again. To do so, no laborious organization of a replacement key and no commissioning of a potentially expensive locksmith is necessary. This can also be helpful in other situations. For example, when children are accidentally entrapped in the vehicle when playing and the key is either in the vehicle or has been carried away by the partner of the vehicle user, for example, who has gone ahead into the shopping center, for example. The user can then request a code via the method according to the invention and free the children using this code. Something similar also happens when they have left something in the vehicle, for example a bag, a pet, or the like. A further possibility for using the method according to the invention, which offers particular advantages in terms of comfort, is that the code requested by the authorized user can also be forwarded to other people. Thus, the code can be transmitted to another person who may open and, where necessary, use the vehicle. A very practical application that would certainly be used often would be, for example, forwarding a single-use code to a parcel service who are thus able to open the vehicle and place the parcel in the vehicle and then lock the vehicle again. In doing so, it would be possible, for example, to have parcels delivered directly inside the vehicle in a company car park, which can certainly be a significant advantage in terms of simplifying the delivery of parcels, which is becoming more and more important in times of increased online shopping.

A particularly advantageous development of the idea here provides that the code has a onetime validity and lapses after being input. In particular, such a onetime valid code, via which the vehicle can be unlocked once after input and then locked, or via which the vehicle can be locked and/or unlocked as often as necessary for a few minutes after input, constitutes a particularly safe use of the method according to the invention. A code spied on by a third party, for example, when it is being input, if it is a number code, for example, and it is input using a door handle, as is known from the prior art, thus does not lead to the third party also still having access to the vehicle at a later point in time, such that the method according to the invention is particularly safe as a result of the described modification.

A very advantageous development of the idea here provides that a numerical code is used as the code. Such a numerical code is easy to generate and can ensure a relatively high degree of safety, for example in the form of a preferably four to six-digit numerical code. Here, according to an advantageous development of the idea, sensors can be used as the input device to open and close the doors and a trunk lid, to the extent as is known from the prior art. Via such sensors, for example the door handle, a button of the trunk lid or also via the touch sensors of a keyless-go controller, the numbers of such a numerical code can be input one after the other, as has already been exemplarily described above with the prior art.

An alternative design of the method according to the invention can also provide that a scanner or a camera is used in the vehicle as the input device, which is activated by the transmitting of the code from the data server to the vehicle, and which records the code on the mobile device. In this way, a more complex code can be transmitted, for example an image code, a QR code, a predetermined pictorial depiction or similar. By transmitting the code from the data server to the vehicle, a scanner can be activated, which, for example at a certain location known to the user of the vehicle, is able to scan a code through the window of the vehicle. To do so, cameras, in particular, can also be used, which are in any case present in the vehicle, for example cameras of the surroundings sensor system or similar. The user can obtain the code, for example, in the form of a QR code, on their mobile device and can hold this in front of the vehicle's camera, which correspondingly scans or records the code and compares it to the code stored in the vehicle.

A further opportunity is that an input field is activated in the region of the vehicle surface as the input device with the transmitting of the code from the data server to the vehicle and reacts to touch inputs. Thus, a touch-sensitive field can be activated on the surface of the vehicle, for example on the window or the lacquer, and can be characterized by an optical depiction. On this field, which can comprise a keyboard, for example, a code or a password can then be typed in or, with a touch-sensitive field, a graphical pattern can also be drawn in using a finger, as is known from unlocking smartphone screens, for example. Here, a camera or sensor system in any case present, for example, can be used to record a corresponding input, for example optical surroundings sensors again or other surroundings sensors used in the vehicle.

In principle, the vehicle can be locked and/or unlocked via the method according to the invention, for example in order to retrieve something enclosed in the vehicle from the vehicle or also, for example, in order to lock the vehicle when the partner with the key is already away from the vehicle and has forgotten to lock the vehicle, when the other partner notices this and is still by the vehicle. Moreover, it is also possible via the method according to the invention that, after successfully locking or unlocking the vehicle, driving authorization is granted for the vehicle. Thus here, similarly to in the prior art, driving authorization can be granted in addition to the locking and/or unlocking of the vehicle, such that a user who unlocks the vehicle, for example with the code that has been sent to them on their mobile phone, can also use the vehicle, can thus drive with the vehicle.

An exceptionally favorable development of the idea here provides that, when requesting the code via the mobile telephone, different parameters relating to the locking and/or unlocking and, where necessary, driving authorization are assigned and transmitted to a controller of the vehicle by the code transmitted to the vehicle. When requesting the code, it can thus already be set as to what is possible inside the vehicle using the code. Thus, for example, it can be set that the boot may be unlocked once and subsequently locked back up again, for example in order to allow a parcel deliverer to place a parcel in the trunk of the vehicle in the scenario with the parcel service stated above. The other doors of the vehicle can correspondingly not be unlocked, and driving authorization is not granted, such that the danger of improper use can be reduced. Alternatively, limited driving authorizations can also be permitted in addition to opening the vehicle, for example in order to allow a parking service to move the vehicle at a limited speed inside a car park or parking space, in order to park it for the user. In this context, for example, it can also be set that there may be a certain period of time between unlocking and locking or also that the vehicle is automatically locked again a certain period of time after unlocking or similar.

A further very advantageous design of the idea further provides that the communication between the data server and the mobile telephone device is carried out via an application, in particular, of the vehicle manufacturer. Such an application, as in the case of the application, for example, the App Mercedes me, can be used, in particular, in order to register corresponding mobile numbers with the respective vehicle, via which a code may be validly requested, and on which the code may then be sent by the data server. Using such an app, it can be set very easily in pre-saved profiles, for example, which parameters are transmitted in the sense described above with the code, for example in order to easily and exceptionally efficiently enable an unlocking with driving authorization, an unlocking without driving authorization, an unlocking of only the boot, or similar via the requested code.

The server with which the mobile device, preferably a smartphone, makes contact in order to request the code and which forwards the corresponding data to the vehicle can be a backend server of the vehicle manufacturer, for example. Such a backend server of the vehicle manufacturer very often has communication authorization with the vehicle in any case in order to offer various services, for example as part of navigation, surroundings detection or similar, such that incorporating the method according to the invention into such a communication path is particularly efficiently possible.

Further advantageous designs of the idea further emerge from the exemplary embodiment, which is described below in more detail with reference to the figures.

BRIEF DESCRIPTION OF THE DRAWING FIGURES

Figure 2:
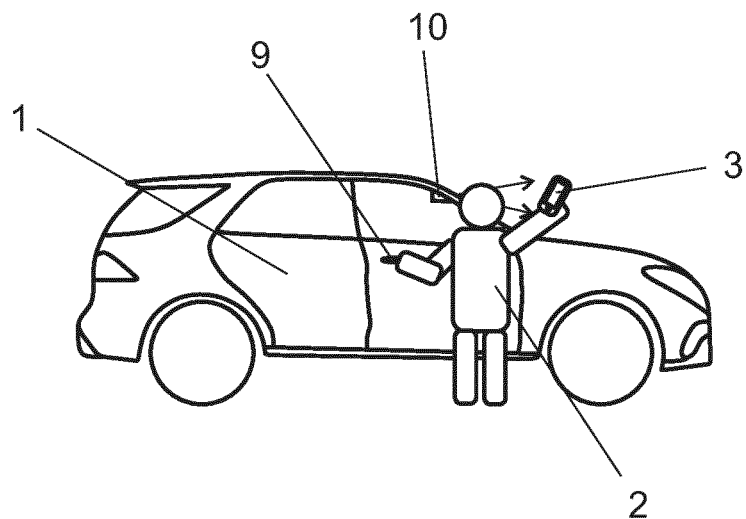

Here are shown:

FIG. 1 a scenario for illustrating the method according to the invention;

FIG. 2 different possible input devices on the vehicle.

DETAILED DESCRIPTION

Purely by way of example, a vehicle 1 is depicted in the depiction of FIG. 1 which is to be locked in the scenario depicted here, wherein the vehicle key has been left inside the vehicle 1 by the user 2 before the vehicle 1 was locked. The user 2 is thus now standing in front of the vehicle 1 and would like to unlock the vehicle 1 in order to reach their key. The user 2 carries a mobile device, for example a smartphone 3, with them. A corresponding application or app of the vehicle manufacturer is preferably installed on this smartphone 3, in the exemplary embodiment depicted here the app Mercedes me, for example. In the application on the smartphone 3, the data of the user 2, their vehicle 1 and their mobile telephone number of the smartphone 3 are correspondingly saved. The user 2 now sends a request 4, indicated here by the dot-dashed line, via their smartphone 3 to a backend server of the vehicle manufacturer. This backend server as the data server 5 now generates a code, for example a numerical code, as the optical code or similar. This code is sent to a control device 6 of the vehicle 1 and, at the same time, to the mobile device 3, provided that it is saved in the data server 5 as the mobile device 3 belonging to the vehicle 1. Here, several mobile devices 3 can also be correspondingly registered, such that it can either be selected as to which of the mobile devices 3 the code is sent or that it is automatically sent back at least to the mobile device 3 that made the request 4. This transmission of the code from the data server 5 into the vehicle or its control device 6, on one hand, and to the mobile device 5, on the other hand, are correspondingly indicated in FIG. 1 with dotted lines and provided with the reference numeral 7 for the transmission to the mobile device 3 and 8 for the transmission to the vehicle 1 or its control device 6.

There is now a corresponding code both in the vehicle 1 and in the mobile device 3 of the user 2. This code can now be input by the user 2. To do so, the vehicle 1 has at least one input device in order to input the code. In the depiction of FIG. 2, the vehicle with the user 2 can be once again seen. There is the possibility, for example, and this is known to an extent from the prior art, of transmitting the code in the form of a numerical code, which can be input by a corresponding actuation of a door handle 9 of the vehicle 1. To do so, the door handle can be actuated, for example, i.e., typically pulled out, respectively as often as corresponds to the number of the numerical code currently to be input. Additionally or alternatively, a touch sensor, for example of a Keyless-Go system, can be correspondingly touched. Other variants, for example pressing buttons in the region of the door handle 9 or, for example, in the region of the device for opening the trunk, which is not thus depicted here, are also conceivable and known to an extent from the prior art. There is an alternative possibility of recording the code displayed on a screen, for example, of the mobile device 3, for example a QR code, a barcode or similar using the device in the vehicle 1. To do so, it is possible, for example, that a corresponding input device of the vehicle is activated with the transmission 8 of the code to the control device 6. In the exemplary embodiment of FIG. 2, this can be a camera, for example, labelled with 10. Ideally, this camera can be present in any case, for example for surroundings detection of the vehicle 1, for example as part of an automatic driving system. Purely by way of example, the camera 10 is depicted here behind the windscreen. A reversing camera could be used just as well or also a barcode scanner or a camera, which are correspondingly installed in the region of the door, here in particular in the region of the side window. Further conceivable variants would be, for example, a larger-area touch-sensitive field in the outer region of the vehicle, for example under the lacquer or in the region of one of the side windows, which is correspondingly marked when the transmission 8 of the code to the control device 6 is carried out, and which can be used, for example, to input a graphical pattern as the code.

Irrespective of the type of input device, which are here correspondingly symbolized by way of example by the door handle 9 and the camera 10, the method can be used correspondingly to the user specifications. For example, it can be used for an emergency unlocking, as in the scenario described here, in which the key has been accidentally entrapped inside the vehicle 1. It can be used just as well when, for example, two people are driving with the vehicle 1 to go shopping and one of the partners is already in the shopping center, while the other partner is still by the open vehicle 1. The partner in the shopping center has taken the key with them and the partner by the vehicle 1 requests a corresponding code with the data server 5, in order to be able to lock the vehicle 1. Other application scenarios are also conceivable and have already been described above in the general part of the description.

In particular when requesting the code via a corresponding application on the mobile device 3, for example the app Mercedes me on a smartphone, in addition to the code, a corresponding configuration can also be undertaken by the user 2, such that only the trunk can be unlocked for example, via the code, the vehicle 1 can be only unlocked and/or locked, though cannot be driven, or the vehicle can be freely used. All this is correspondingly useful for the user 2 in different situations and can be correspondingly configured when requesting the code, such that, when transmitting 8 from the data server 5 to the control device 6, these authorizations can also be transmitted in addition to the code, and thus only the boot can be unlocked, for example, or similar.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for locking or unlocking a vehicle, the method comprising:
   requesting, via a mobile device having a mobile number registered to the vehicle, a code from a data server, wherein the requesting of the code includes parameters related the locking or unlocking the vehicle, and wherein the parameters include at least a number of times the code is valid for locking or unlocking the vehicle and which doors are locked or unlocked by the code, and wherein the mobile device is outside of the vehicle;
   generating, by the data server, a current code;
   sending, by the data server, the current code to the mobile device and the vehicle, wherein the current code is sent to the vehicle along with the parameters;
   inputting, via an input device of the vehicle, the current code;
   comparing, by the vehicle, the inputted current code with the current code sent by the data server to the vehicle;
   determining, by the vehicle, whether the code is valid for locking and unlocking the vehicle based on at least the parameters and a number of previous times the code has been input via the input device of the vehicle; and
   locking or unlocking the vehicle responsive to a match between the inputted current code and the current code sent by the data server to the vehicle and responsive to the determination that the code is valid for locking or unlocking the vehicle,
   wherein the current code has a one-time validity and expires after the current code is input via the input device of the vehicle.

2. The method of claim 1, wherein the current code is a numerical code.

3. The method of claim 2, wherein the input device is one or more sensors for opening or closing doors of the vehicle or a trunk lid of the vehicle.

4. The method of claim 1, further comprising:
   displaying the current code on a display of the mobile device,
   wherein the input device is a scanner or a camera, which becomes active with when the current code is sent from the data server to the vehicle, and which records the current code displayed by the mobile device.

5. The method of claim 1, wherein the input device is an input field in a region of an outer surface of the vehicle and the input field reacts to touch inputs, wherein the input field is activated as the input device when the current code is sent from the data server to the vehicle.

6. The method of claim 1, wherein, subsequent to locking or unlocking the vehicle, driving authorization is granted for the vehicle.

7. The method of claim 1, wherein the requesting of the code and receipt of the current code by the mobile device is performed via an application provided by manufacturer of the vehicle.

8. The method of claim 1, wherein the data server is a backend server of a manufacturer of the vehicle.

9. The method of claim 1, wherein the parameters further comprise limited driving authorizations defining a speed limit for driving the vehicle.

\* \* \* \* \*